E. N. MAULL.
FRUIT GRADER.
APPLICATION FILED JULY 28, 1911.
1,035,887.
Patented Aug. 20, 1912.
2 SHEETS—SHEET 2.
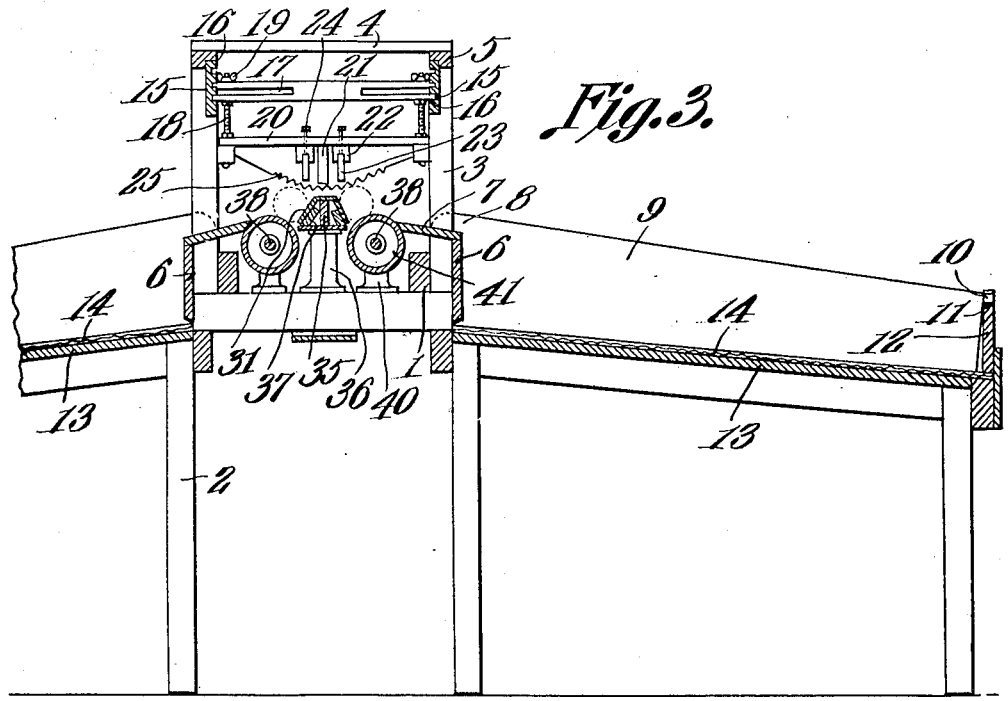
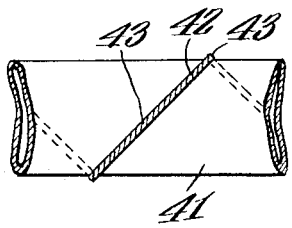
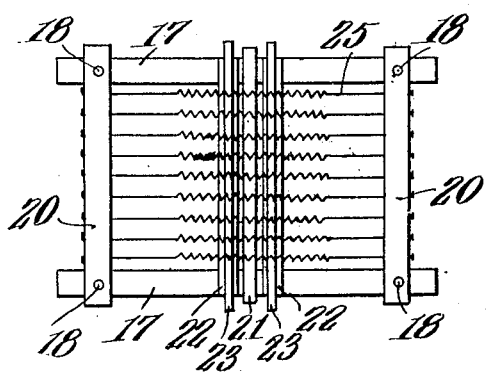
Witnesses
Edward N. Maull,
Inventor
by C. A. Snow & Co.
Attorneys

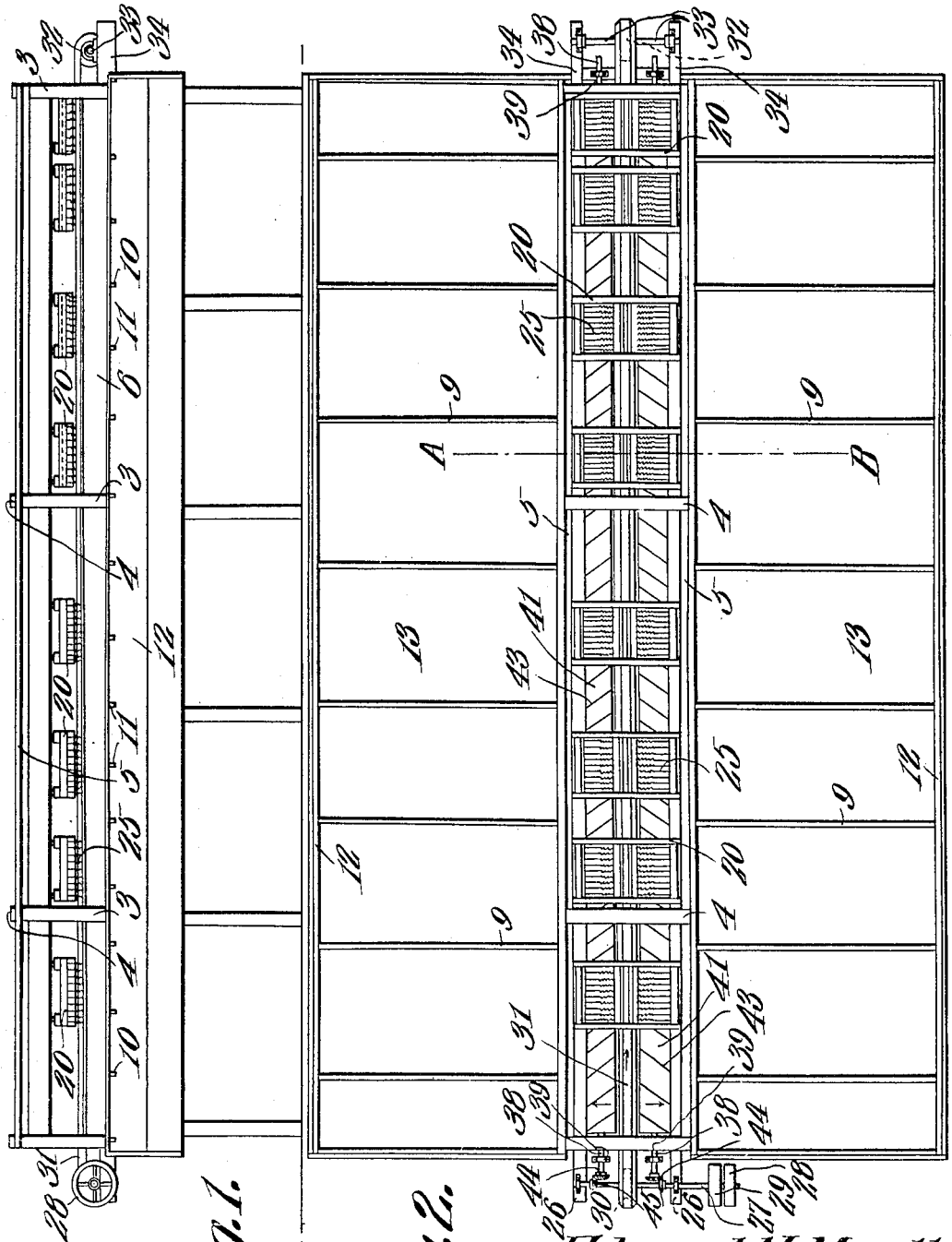

UNITED STATES PATENT OFFICE.

EDWARD N. MAULL, OF JACKSONVILLE, FLORIDA.

FRUIT-GRADER.

1,035,887.  Specification of Letters Patent.  Patented Aug. 20, 1912.

Application filed July 28, 1911. Serial No. 641,099.

*To all whom it may concern:*

Be it known that I, EDWARD N. MAULL, a citizen of the United States, residing at Jacksonville, in the county of Duval and State of Florida, have invented a new and useful Fruit-Grader, of which the following is a specification.

This invention relates to machines for grading oranges, grape fruits, and the like.

It has been difficult, heretofore, to properly grade round fruits, such as oranges, for the reason that some of the fruits are of irregular contours and have been graded according to their smallest diameters instead of by their greatest diameters, said last named method being the most desirable.

The principal object of the present invention is to provide means whereby fruits of varying diameters will be accurately graded according to their greatest dimensions, the largest fruits being first removed while the smallest ones are discharged last, thus reducing the load to which the machine is subjected while in operation.

A further object is to provide a fruit grading machine having means whereby each fruit is rotated during its movement through the machine thus positively engaging the gage used in connection with the machine and insuring the ejection of the fruit at the point where its greatest diameter is equal to the distance to which the gage is set.

A further object is to provide a grading machine the parts of which are adjustable so as to handle any increased or reduced quantity of fruit of one or more grades.

A further object is to provide improved means for handling fruit without danger of injuring it.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

In said drawings:—Figure 1 is a side elevation of the machine. Fig. 2 is a plan view thereof. Fig. 3 is an enlarged vertical transverse section on the line A—B Fig. 2. Fig. 4 is a plan view of a portion of one of the rollers. Fig. 5 is a bottom plan view of one of the gages.

Referring to the figures by characters of reference 1 designates a frame mounted on suitable supports 2 and provided, at desired intervals, with standards 3 connected by cross members 4 and by longitudinal side strips 5. Face boards 6 are secured along the sides of the frame and delivery boards 7 are arranged upon the upper edges of the boards 6 and extend inwardly and upwardly therefrom and throughout the length thereof. Notches are formed within the upper edges of the side strips or boards 6 and receive projections 8 formed at the inner ends of partitions 9. The outer ends of these partitions have projections 10 detachably seated in notches 11 formed in the outer side walls 12 of bins 13, One of these bins is disposed at each side of the frame 1, the bottom of each bin being covered with or formed of a wire or other fabric, such as indicated at 14. Obviously the partitions 9 serve to divide the bins into different compartments, the lower edges of the partitions resting on the bottoms of the bins. By disengaging the partitions from the notches in which they are seated and placing them in other notches, the sizes of the compartments between the partitions can be varied at will. Supporting strips 15 are secured to the upper portions of the standards 3 and upon the inner faces thereof. there being parallel grooves 16 within the inner faces of these strips. Said grooves are adapted to receive the end portions of cross bars 17 and these cross bars are engaged by screw threaded hangers 18 held in place by wing nuts 19 or other suitable adjusting means. The lower ends of the hangers engage the corner portions of a frame 20 having a central spacing strip 21 extending downwardly therefrom and guide strips 22 secured to the lower face of the frame at the sides of the strip 21. These guide strips are slotted and adjusting blocks 23 are slidably mounted in the slots and have adjusting screws 24 swiveled therein and extending through the frame 20. Blocks 23 bear downwardly upon coiled springs 25, the ends of the springs being secured to the sides of the frame 20 while the middle portions thereof extend under the central spacing strip 21. It will thus be apparent that the end portions of each spring diverge upwardly from the block 23 but, by shifting blocks 23 downwardly the said springs can be elongated and moved downwardly any desired distance.

The cross strips 17 are preferably arranged in pairs, the hangers on each pair supporting a single frame 20. Each frame has a plurality of springs 25 connected to it. These springs, their frames 20 and bars 17 coöperate to form a gage having a broad lower face as indicated in Fig. 5 and any desired number of gages may be used. It is preferred to use one gage for each compartment at one side of the machine or, in other words, one gage for each pair of opposed bin compartments. If desired, however, two or more gages can be placed close together so as to form practically a single continuous gage and in that event the partitions separating the compartments located at the sides of the said gages, can be removed so as to increase the capacities of the compartments adapted to receive fruit from under the gages.

A pair of arms 26 is extended from one end of the frame 1 and a transversely extending drive shaft 27 is journaled thereon, this shaft being provided at one end with a fixed pulley 28 and a loose pulley 29 either of which is adapted to be rotated by a belt not shown. A sprocket 30 is secured upon the shaft 27 and an endless belt of canvas or other suitable flexible material extends partly therearound and longitudinally of the frame 1 and midway between the sides of the frame. This belt, which has been indicated at 31, also extends partly around a sprocket wheel 32 secured to a shaft 33 which is journaled upon arms 34 extending from the other end of frame 1. At points between the sprockets 30 and 32, the upper run of the belt is supported by a guide strip 35 mounted at suitable points upon posts or standards 36. The side portions of the belt are unsupported by the sprockets 30 and 32 and are thus free to hang downwardly and to travel along inclined guide strips 37 disposed along the sides of the strip 35.

Parallel shafts 38 are arranged longitudinally above the frame 1 and along opposite sides of the guide strips 35 and 37, these shafts being mounted in suitable bearings 39 located adjacent the ends of the shafts and are supported, at intermediate points, by posts or brackets 40 mounted on the frame. Each shaft 38 has two alining rollers secured thereto and revoluble therewith, these rollers being indicated at 41, and the inner ends of the rollers are spaced apart a distance merely sufficient to permit the brackets 40 to extend between them. Each roller 41 has a spiral groove 42 in its outer face and a rope 43 or the like is seated within the groove and extends a short distance beyond the periphery of the roller and thus forms a yielding spiral rib upon the roller, as indicated. Each shaft 38 is provided, at one end, with a beveled gear 44 and these gears mesh with gears 45 secured to the shaft 27. The gears are so disposed that, when shaft 27 is rotated, the two shafts 38 will be simultaneously rotated but in opposite directions.

As shown in Figs. 1 and 2, a number of gages can be arranged in each machine. In adjusting these gages they are placed desired distances apart so that the fruit stopped by them will be shifted laterally by the rotating rolls into the bins at the sides of the gages. The gage nearest the inlet end of the machine has its springs adjusted away from the rolls 41 sufficient distances to permit all but the largest grade of fruits to pass under them without contacting therewith. The springs of the next gage are adjusted so as to engage and hold the largest fruits fed to the gage, although permitting the other grades of fruit to pass on to the next adjoining gage. This adjustment is continued throughout the length of the machine so that the smallest fruits supplied to the machine will be brought into contact with the springs of the last gage. When fruit is supplied to the machine it is supported between the inclined sides of the belt 31 and the two rolls 41. As the belt is constantly moving toward the discharge end of the machine it gradually rolls them along the rolls 41 and as these rolls are constantly rotating in the direction of the arrows shown in Fig. 2, it will be apparent that they, in turn, roll the fruits upon the belt 31. As there is a series of springs included in each of the gages, it will be seen that while each fruit is passing under the springs of each gage, said fruit will be rolled in different directions while passing thereunder, so that, should it be of varying diameter, and its greatest diameter should be equal to or slightly greater than the distance between the rolls 41 and the springs 25, the fruit will frictionally engage the springs and will be rolled outwardly along the springs until it passes the vertical center of the rolls whereupon the fruit will roll outwardly by gravity onto the adjacent delivery board thence into the compartment opposite the gage. Those fruits passing under the first gage will be conveyed by the belt 31 to a position under the springs of the next adjoining gage which is nearer the belt and the rolls 41. The foregoing operation will then be repeated and any of the fruit contacting with the springs of the gage will be discharged laterally onto the delivery board thence into the bin or compartment opposite the gage. The spiral ribs upon the rolls engage the fruits and prevent them from piling upon the belt and not moving forwardly with sufficient rapidity. As these ribs are of soft material, however, they will not injure the fruit contacting with them.

What is claimed is:—

1. A fruit grader including means for rolling fruit about a constantly varying axis, and a gage having means extending longitudinally of and above the fruit rolling means for engaging any point of greatest diameter of fruit passing thereunder.

2. A fruit grader including means for rolling fruit about a constantly varying axis, and a gage having yielding means extending longitudinally of and above the fruit rolling means, for engaging any point of greatest diameter of fruit passing thereunder.

3. A fruit grader including means for rolling fruit about a constantly varying axis, and separate fixed gages extending longitudinally of and at different distances from the fruit rolling means and each having means for engaging any point of greatest diameter of fruit passing thereunder.

4. A fruit grader including means for rolling fruit about a constantly varying axis, and separate spaced gages extending longitudinally of and at different distances from the fruit rolling means and each including yielding means for engaging any point of greatest diameter of fruit passing thereunder.

5. A fruit grader including means for rolling fruit about a constantly varying axis, a gage having means extending longitudinally of and above the fruit rolling means for engaging any point of greatest diameter of fruit passing thereunder, and means for adjusting the gage toward or from the fruit rolling means.

6. In a fruit grader, a gage extending longitudinally of the path of the fruit, and including a group of parallel closely related spaced fruit engaging members, and means for rolling fruit, while under the gage, to bring any point of greatest diameter into engagement with the members.

7. In a fruit grader, a gage extending longitudinally of the path of the fruit and including a yieldable fruit engaging portion, and means for rolling fruit while under the gage to bring its point of greatest diameter into engagement with said portion.

8. In a fruit grader, a gage extending longitudinally of the path of the fruit and including a group of closely related parallel yielding fruit engaging members, and means for rolling fruit while under the gage to bring its point of greatest diameter into engagement with said members.

9. In a fruit grader, a gage extending longitudinally of the path of the fruit and including a group of closely related parallel upwardly and laterally inclined fruit engaging members, and means for rolling the fruit, while under the gage, to bring its point of greatest diameter into engagement with said members.

10. In a fruit grader, a gage extending longitudinally of the path of the fruit and including a group of closely related parallel upwardly and laterally inclined fruit engaging members yieldable upwardly, and means for rolling fruit while under the gage, to bring its point of greatest diameter into engagement with said members.

11. In a fruit grader, a gage extending longitudinally of the path of the fruit and including a group of closely related parallel upwardly and laterally inclined fruit engaging members, means for rolling fruit, while under the gage, to bring its point of greatest diameter into engagement with the members, and means for adjusting the gage toward or from the fruit rolling means.

12. In a fruit grader, a gage extending longitudinally of the path of the fruit and including a group of closely related parallel upwardly and laterally inclined fruit engaging members yieldable upwardly, means for rolling fruit, while under the gage, to bring the point of greatest diameter of the fruit into engagement with said members, and means for adjusting the gage toward or from the fruit rolling means.

13. A fruit grader including a plurality of separate gages extending longitudinally of the path of the fruit and each including a group of closely related, parallel upwardly and laterally inclined fruit engaging members yieldable upwardly, and means for rolling fruit under the respective gages to bring its points of greatest diameter into engagement with the member.

14. A fruit grader including a plurality of separate gages extending longitudinally of the path of the fruit and each including a group of upwardly and laterally inclined fruit engaging members yieldable upwardly, means for rolling fruit successively under the respective gages to bring the points of greatest diameter into engagement with the members, and means for independently adjusting the gages toward or from the fruit rolling means.

15. A fruit grader including an endless conveying belt, a continuously operating roll parallel with the belt and coöperating therewith to form a trough, and a yieldable gage supported above the conveyer and roll for frictionally engaging fruit of a predetermined size.

16. A fruit grader including a conveyer belt, a roll parallel therewith and adjacent thereto, said roll and belt coöperating to form a trough, means for simultaneously and continuously rotating the roll and moving the belt, and a gage supported above the trough, said gage including adjustable yielding fruit engaging elements.

17. A fruit grader including a conveyer belt, a roll parallel therewith and adjacent thereto, said roll and belt coöperating to form a trough, means for simultaneously moving the belt and for rotating the roll to revolve the fruit in the trough about a constantly changing axis, and a gage extending over the trough and including a series of yieldable fruit engaging elements, and means for adjusting said elements toward or away from the trough.

18. In a fruit grader, a gage including a frame, a spacing element depending therefrom, a series of elastic elements connected to the frame and extending under the spacing element, means carried by the frame for adjusting said elements toward or away from the frame, an ejecting roll mounted for rotation under the gage, and a conveyer movable close to and parallel with the roll, said roll and conveyer coöperating to form a fruit receiving trough.

19. A fruit grader including continuously operating coöperating means for rolling the fruit about a constantly changing axis, a plurality of gages overhanging said means and shiftable relative to each other, each gage including an upwardly and laterally inclined group of parallel yieldable means for intercepting fruit of a predetermined diameter, a bin having compartments opposite the respective gages, and a delivery board for directing fruit from the gages into the respective bins.

20. A fruit grader including an endless conveyer, a fixed guide having inclined side portions constituting supports for the inclined side portions of the upper run of the conveyer, rolls parallel with and coöperating with the inclined portions of the conveyer to form troughs, means for rotating the rolls to deliver fruit upwardly and outwardly, and a gage having yielding fruit engaging means for operating with the rolls to eject fruit from the troughs.

21. A fruit grader including conveying means, means coöperating therewith for rotating the fruits being conveyed, about a constantly changing axis, and a gage supported above and slidable longitudinally of said means, said gage including a frame, means for shifting the frame toward and away from said conveying means, a series of elastic fruit engaging devices supported by and depending from the frame, and means for adjusting said devices toward and away from the conveyer.

In testimony that I claim the foregoing as my own, I have hereto affixed my signature in the presence of two witnesses.

EDWARD N. MAULL.

Witnesses:
FRED M. DOWNING,
W. B. MAULL.

Copies of this patent may be obtained for five cents each, by addressing the "Commissioner of Patents, Washington, D. C."